Figure 1:
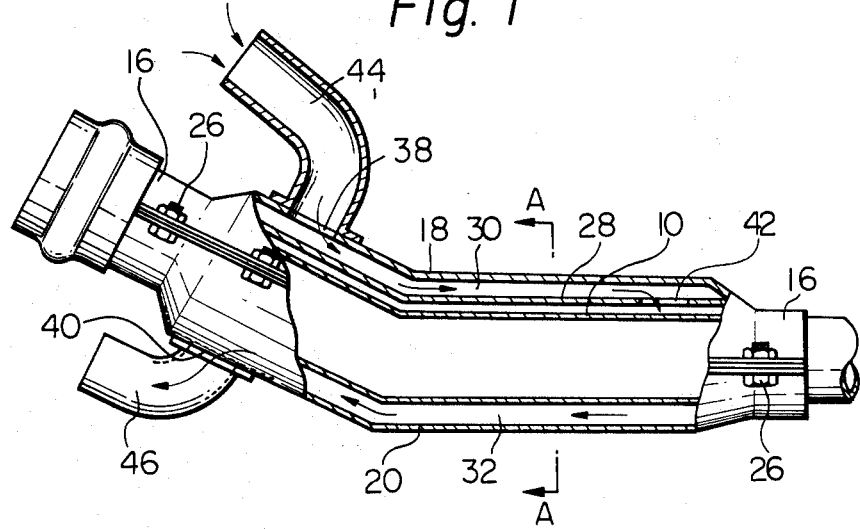

United States Patent [19]

Amagai et al.

[11] 4,050,430
[45] Sept. 27, 1977

[54] INTAKE AIR WARMING DEVICE

[75] Inventors: Susumu Amagai; Shigeru Oikawa, both of Yokohama, Japan

[73] Assignee: Nissan Motor Co., Limited, Japan

[21] Appl. No.: 712,052

[22] Filed: Aug. 6, 1976

[30] Foreign Application Priority Data

Aug. 8, 1975 Japan .......................... 50-110362[U]

[51] Int. Cl.² ............................................ F02M 31/00
[52] U.S. Cl. .............................. 123/122 D; 123/122 R
[58] Field of Search ........ 123/122 D, 122 R, 122 AA, 123/122 E

[56] References Cited

U.S. PATENT DOCUMENTS

| | | | |
|---|---|---|---|
| 1,149,699 | 10/1915 | Sperry | 123/122 D |
| 1,157,189 | 10/1915 | Snyder | 123/122 D |
| 1,925,032 | 8/1933 | Dunner | 123/122 AA |
| 3,886,919 | 6/1975 | Frezman | 123/122 E |

*Primary Examiner*—Ronald H. Lazarus
*Attorney, Agent, or Firm*—Lowe, King, Price & Markva

[57] ABSTRACT

A first air-warming chamber partially surrounds a second air-warming chamber, which is disposed about an exhaust pipe. Air is passed through the first then second chambers in a zigzag flow path. The prewarmed air entering the second chamber is further heated to a desired level.

10 Claims, 2 Drawing Figures

INTAKE AIR WARMING DEVICE

The present invention relates to an intake air warming device for warming intake air to be supplied to an air intake system of an internal combustion engine.

For the purpose of reducing the concentrations of the unconsumed hydrocarbons and carbon monoxide in the engine exhaust gases, exhaust gas heat and engine coolant heat are utilized to promote atomization of a fuel in an air-fuel mixture before combustion in the engine.

In case of utilizing the heat of exhaust gases, a conventional internal combustion engine is equipped with an intake air warming device such as a heat shroud assembly for taking warmed air around an exhaust pipe and conducting the warmed air to an air intake system such as an air cleaner.

For taking sufficiently warmed air around the exhaust pipe, the heat shroud assembly includes a shroud defining an air-warming space between the shroud and the exhaust pipe.

However the heat exchange efficiency between the exhaust gas and the air flowing through such a space is poor. Therefore the conventional heat shroud assembly is apt to be bulky in the longitudinal size extending along the longitudinal length of the exhaust pipe to provide the necessary length of air-warming space wherethrough the air flowing through the space is warmed up to a desired temperature.

If the longitudinal length of such heat shroud assembly is shortened for compact construction, desirable atomization of a fuel in air-fuel mixture, especially during idling condition of the engine, cannot be achieved.

It is therefore an object of the present invention to provide an improved intake air warming device which has increased heat exchange efficiency between exhaust gas and air to be warmed and which has a compact construction.

It is an another object of the present invention to provide an intake air warming device which has a simple construction, fabricated of only a few and simply shaped parts, whereby parts and assembly costs are minimized.

Figure 2:
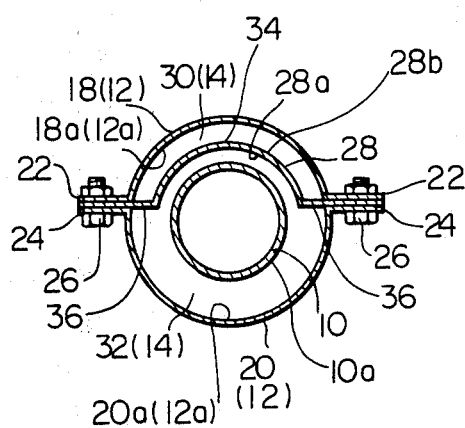

Other objects, features and advantages of the present invention will become apparent from the following description in connection with the accompanying drawings, in which:

FIG. 1 is a side elevation in diagramatic form and partly in cross section showing an intake air warming device according to the present invention; and FIG. 2 is a traverse sectional view taken along the line A—A of FIG. 1.

Referring to FIGS. 1 and 2, reference numeral 10 indicates an exhaust gas conduit which communicates with the exhaust ports of an internal combustion engine (not shown) and through which exhaust gas is emitted to the outside atmosphere. The exhaust gas conduit 10 may be an exhaust pipe or an exhaust manifold, but is more preferably an exhaust pipe and therefore will be described hereinafter only as an exhaust pipe for clarity.

A substantially cylindrical hollow housing 12 is arranged on the outside wall 10a of the upstream portion of the exhaust pipe 10 to provide a space 14 between the inside wall 12a of the housing 12 and the outside wall 10a of the exhaust pipe 10.

The housing 12 is formed with, toward each axial end, a tapering portion for providing therewith a radially reduced end portion 16 at which the housing 12 engages on the outside wall 10a of the exhaust pipe 10 and is sealingly fitted thereon to define an elongated enclosed space 14 of substantially annular cross section. The housing 12 is preferably made from two half shell sections which are respectively shown in FIG. 2 as a first shell member 18 and a second shell member 20. Each of the first and second shell members 18 and 20 has a body portion of semicircular cross section, a tapering portion toward each longitudinal end for providing therewith a radially reduced end portion 16 at which said housing is sealingly fitted on the outside wall 10a of said exhaust gas conduit 10. Each of the first and second shell members 18 and 20 are further formed with radially projected flange portions 22 or 24 which extend longitudinally thereof.

The first and second shell members 18 and 20 are so shaped as to be assembled into the housing 12 and to be fixedly mounted on the outside wall 10a of the exhaust pipe 10 when the corresponding flange portions 22 and 24 are fastened together by the fastening means such as bolts and nuts 26.

A partition member 28 preferably made of highly heat conductive material is disposed within the housing 12. The partition member 28 is so disposed within the housing 12 to radially separate the enclosed space 14 into a first air-warming chamber 30 and a second air-warming chamber 32. As shown in the drawing, the first air-warming chamber 30 is defined between the inside wall 18a of the first shell member 18 and the outside wall 28b of the partition member 28, viz., the first air-warming chamber 30 is defined radially outside of the partition member 28. The second air-warming chamber 32 is defined between the inside wall 20a of the second shell member 20 and the inside wall 28a of the partition member 28, viz., the second air-warming chamber 32 is defined radially inside of the partition member 28.

With respect to effectively disposing the partition member 28 within the housing 12, various measures are available according to the shape of the partiton member 28. In this embodiment, a very advantageous example of securing the partition member 28 to the housing 12 and one example of the partition member 28 with a very simple shape are shown. The partition member 28 preferably has an elongated body portion 34 of semicircular cross section and a radially projected flange portions 36 which extend longitudinal thereof. The flange portions 36 of the partition member 28 are respectively placed between the corresponding flange portions 22 and 24 of the first and second shell members 18 and 20 and then fastened fixedly therebetween by bolts and nuts 26 which also serve as a fastening means for assembling the first and second shell member 18 and 20 into the housing 12 and for mounting the housing 12 on the exhaust pipe 10.

In order to hermetically seal the first and second air-warming chambers 30 and 32, packings such as gaskets (not shown) may preferably be sandwitched between the joining portions, viz., between the cooperating flange portions 22, 24 and 36 and between the inside wall of the radially reduced end portions 16 and the outside wall 10a of the exhaust pipe 10.

An air inlet 38 is provided in the first shell member 18 for delivering air to be warmed thereto and an outlet 40 is provided in the second shell member 20 for conveying warmed air therefrom. To establish communication between the first and second air-warming chambers 18 and 20, an opening 42 which may be a slit is provided in the partition member 28.

In order to effectively exchange heat between the exhaust gas and the air to be warmed, the respective locations of the inlet 38, the opening 42 and the outlet 40 are determined in such a manner that the air to be warmed is forced to flow throughout the lengths of the first and second air-warming chambers 30 and 32. For achieving the above mentioned object, as shown in the drawing, the inlet 38 is located at one end of the first air-warming chamber 30 and the opening 42 is oppositely located at the other remote end thereof and which also serves as the opening for the second air-warming chamber 32, and the outlet 40 is oppositely located at the other remote end of the second air-warming chamber 32, whereby a zigzag air flow path is formed in the intake air warming device according to the present invention. In this embodiment, the inlet 38 and the outlet 40 are preferably located upstream of the opening 42 with respect to the flow of the exhaust gas in the exhaust pipe 10.

Reference numeral 44 is an air inlet duct with a bent portion for introducing air of the outside atmosphere to the inlet 38 while preventing undesirable particles such as water or mud directly coming into the first air-warming chamber 30 and further into the second air-warming chamber 32. An air outlet duct 46 is also provided at the outlet 40 for facilitating connection to a conveyer means (not shown) through which warmed air from the second air-warming chamber 32 is supplied to an intake system such as an air cleaner (not shown) of an internal combustion engine.

With these constructions and arrangements, the engine is cranked to operate, inducting air through the intake air warming device into the intake system via the intake stroke of the engine. Hot exhaust gases are subsequently emitted through the exhaust pipe 10.

The intake air is effectively warmed according to the present invention as it passes through the intake air warming device as will be explained hereinafter. The intake air is first delivered into the first air-warming chamber 30 through the air inlet duct 44 and the air inlet 38 and flows therefrom toward the opening 42 in the partition member 28 as shown by arrows from left to right in FIG. 1. The intake air then flows into the second air-warming chamber 32 through the opening 42 while turning its flow to the reverse direction and travels therefrom toward the air outlet 40 as shown by arrows from right to left in FIG. 1.

In this instance, since the first air-warming chamber 30 is supplied with the heat of exhaust gas through the second air-warming chamber 32 which is exposed with the heat of the exhaust gas only through the wall of the exhaust pipe 10, the temperature of the first air-warming chamber 30 is always lower than the second air-warming chamber 32. Thus, the intake air is first warmed up by a relatively small amount of heat in the first air-warming chamber 30 and then further warmed up to the desired high temperature by a relatively large amount of heat in the second air-warming chamber 32.

From the above descriptions, it will be understood that the intake air warming device according to the present invention has improved efficiency since it advantageously includes the first air-warming chamber 30 which serves as a heat insulation layer of the second air-warming chamber 32 and moreover the first air-warming chamber 30 conducts heat to the intake air before the intake air enters the second air-warming chamber 32. The features of such heat conducting process of the intake air warming device according to the present invention reside in that the radiated heat of the second air-warming chamber 32 is conducted to the first air-warming chamber 30 where the intake air is warmed to some extent before it enters the second air-warming chamber 32. Therefore the amount of heat of the exhaust gas given to the second air-warming chamber 32 is conducted to the intake air with improved efficiency.

From the foregoing descriptions, it will be further understood that the intake air warming device according to the present invention is so constructed that the intake air to be warmed travels the longitudinal length of the intake air warming device two times while being successively exposed to the heat of the exhaust gas before conveyed therefrom to the intake system, thus, the necessary length of the intake air warming device to extend along the exhaust pipe 10 can be considerably shortened.

It will be still further understood that the intake air warming device according to the present invention is composed of only a few and rather simply shaped parts, whereby parts and assembly costs are minimized.

Although the present invention has thus far been explained and shown according to the embodiment which includes only two first and second air-warming chambers, any number of air-warming chambers can be constructed within the housing if it is desirable to supply warmed air of further elevated temperature or to further shorten the longitudinal length of the device.

What is claimed is:

1. An internal combination engine including an intake air warming device for warming intake air to be supplied to an intake system of comprising:
    an exhaust gas conduit communicated with exhaust ports of the engine and through which hot exhaust gas is emitted to the atmosphere;
    an elongated hollow housing surrounding said exhaust gas conduit to define therebetween an enclosed space;
    at least one partition member disposed within said housing and spaced apart from the inside wall of said housing for radially separating said enclosed space surrounding said exhaust conduit into at least first and second air-warming chambers, said first air-warming chamber defined radially outside of said partition member and said second air-warming chamber defined radially inside of said partition member;
    an air inlet opening into said first air-warming chamber and allowing air to flow therein;
    an opening provided in said partition member and allowing the air having entering said first air-warming chamber to flow therefrom into said second air-warming chamber; and
    an air outlet opening into said second air-warming chamber and allowing the warmed air to be conveyed therefrom to the intake system.

2. An intake air warming device as set forth in claim 1, in which said air inlet, said opening and said air outlet are alternately arranged between one and the other longitudinal sides of the intake air warming device to provide a zigzag air flow path with said device.

3. An intake air warming device as set forth in claim 2, in which both air inlet and said air outlet are located at said one longitudinal side and said opening is located at said the other longiitudinal side.

4. An intake air warming device as set forth in claim 3, in which said one longitudinal side is upstream of said the other longitudinal side with respect to the flow of exhaust gas in said exhaust gas conduit.

5. An exhaust air warming device as set forth in claim 1, in which said housing is comprised of two half sections each of which has a body portion of semicircular cross section, a tapering portion toward each longitudinal end for providing therewith a radially reduced end portion at which said housing is sealingly fitted on the outside wall of said exhaust gas conduit, and radially projected flange portions which extend longitudinally thereof and which are fastened to the corresponding flange portions of the other of said two half sections.

6. An intake air warming device as set forth in claim 5, in which said partition member has an elongated body portion of substantially semicircular cross section and a radially projected flange portion which extend longitudinally thereof and which are sandwiched between the flange portions of said two half sections of said housing so as to be fixedly carried therebetween.

7. An intake air warming device as set forth in claim 1, in which said air inlet further includes an air inlet duct which has a bent portion.

8. An intake air warming device as set forth in claim 1, in which said air outlet further includes an air outlet duct which has a bent portion.

9. An intake air warming device as set forth in claim 1, in which said exhaust gas conduit is an exhaust pipe.

10. An intake air warming device as set forth in claim 1, in which said exhaust gas conduit is one branch of an exhaust manifold.

* * * * *